(12) United States Patent
Hunt et al.

(10) Patent No.: US 6,891,660 B2
(45) Date of Patent: May 10, 2005

(54) STIMULATED BRILLOUIN SCATTERING OPTICAL AMPLIFIER

(75) Inventors: Jeffrey H. Hunt, Chatsworth, CA (US); Robert J. Atmur, Whittier, CA (US)

(73) Assignee: The Boeing Company, Irvine, CA (US)

( * ) Notice: Subject to any disclaimer, the term of this patent is extended or adjusted under 35 U.S.C. 154(b) by 274 days.

(21) Appl. No.: 10/342,679

(22) Filed: Jan. 15, 2003

(65) Prior Publication Data

US 2004/0136052 A1 Jul. 15, 2004

(51) Int. Cl.$^7$ ................................................. H01S 3/00
(52) U.S. Cl. ...................................................... 359/334
(58) Field of Search ................................ 359/334, 337; 372/3

(56) References Cited

U.S. PATENT DOCUMENTS

| 3,414,354 A | | 12/1968 | Siegler | |
| 3,515,897 A | * | 6/1970 | Culver | ........................ 359/334 |
| 5,379,147 A | * | 1/1995 | Cook | ........................... 359/334 |

FOREIGN PATENT DOCUMENTS

FR 000540381 A1 * 10/1992

OTHER PUBLICATIONS

Y. R. Shen, *The Principles of Nonlinear Optics*, University of California, Berkeley, pp. 187–195, ISBN 0–471–88998–9, 1984.

D. Pohl et al., *Time–Resolved Investigations of Stimulated Brillouin Scattering in Transparent and Absorbing Media: Determination of Phonon Lifetimes*, Physical Review B, vol. 1, No 1, pp. 31–43, Jan. 1, 1970.

M. Maier et al., *Transient Threshold Power of Stimulated Brillouin Raman Scattering*, Physics Letters, vol. 34A, No 8, pp. 299–300, Apr. 5, 1971.

C.L. Tang, *Saturation and Spectral Characteristics of the Stokes Emission in the Stimulation Brillouin Process*, Journal of Applied Physics, vol. 37, No. 4, pp. 2945–2955, Jul. 1966.

M. Maier, *Quasisteady State in the Stimualted Brillouin Scattering of Liquids*, Physical Review, vol. 166, No 1, pp. 113–119, Feb. 5, 1968.

R. Y. Chiao et al., *Stimulated Brillouin Scattering and Coherent Generation of Intense Hypersonic Waves*, Physical Review Letters, vol. 12, No 21, pp. 592–596, May 25, 1964.

Norman M. Kroll, *Excitation of Hypersonic Vibrations by Means of Photoelastic Coupling of High–Intensity Light Waves to Elastic Waves*, Journal of Applied Physics, vol. 16, No 1, pp. 34–43, Jan. 1965.

* cited by examiner

*Primary Examiner*—Mark Hellner

(57) ABSTRACT

The stimulated Brillouin scattering optical amplifier includes a first control optics assembly, a driver element, a second control optics assembly, a Brillouin active medium, and egressing optics. The first control optics assembly receives an incoming laser beam and adjusts that incoming laser beam in accordance with first desired wavelength, polarization and beam propagation parameters. A driver element produces a driver laser beam. A second control optics assembly receives the driver laser beam and adjusts that driver laser beam in accordance with second desired wavelength, polarization and beam propagation parameters. A Brillouin active medium receives an output from the first control optics assembly and an output from the second control optics assembly. The Brillouin active medium provides a non-linear optical interaction between the outputs such that the incoming laser beam is amplified producing an amplified Brillouin active medium output laser beam and a depleted driver laser beam. Egressing optics receives the amplified Brillouin active medium output laser beam and the depleted driver laser beam. The egressing optics controllably transmits the amplified Brillouin active medium output laser beam in accordance with third desired wavelength, polarization, and beam propagation parameters and prevents transmission of the depleted driver laser beam. The output of the egressing optics includes an amplified egressing optics output laser beam.

27 Claims, 1 Drawing Sheet

STIMULATED BRILLOUIN SCATTERING OPTICAL AMPLIFIER

BACKGROUND OF THE INVENTION

1. Field of the Invention

This invention relates to optical amplifiers and more particularly to an optical amplifier that uses stimulated Brillouin scattering for providing optical amplification.

2. Description of the Related Art

To this point, optical signal amplifiers have been dominated by Raman amplifiers. For example, U.S. Pat. No. 3,414,354, issued to E. H. Siegler Jr., entitled Raman Spectrometers, is a seminal publication disclosing the use of stimulated Raman scattering, to provide optical amplification. In a later example, U.S. Pat. No. 3,515,897, issued to W. H. Culver, discloses a design for implementing stimulated Raman scattering as an amplifier.

Use of Raman scattering; however, has limitations in its operation and implementation. Examination of the equations that govern stimulated Raman scattering break down into two terms. The first term is associated with the wave that is being amplified, also known as the Stokes wave. The second term is associated with a material excitation that is a product of the Raman scattering. That material excitation causes inherent inefficiencies and engineering difficulties that cannot be removed. Consequently, stimulated Raman scattering can be considered as a parametric or coupled generation process in which the optical pump wave generates a Stokes wave (i.e. the amplified input) and a material excitation wave. This material excitation wave is part of the coupled wave physical process which allows the input beam to be amplified, but does not contribute anything to the desired amplification. The energy that is distributed to the material excitation is lost to the optical output. Furthermore, this material wave eventually couples its energy into thermal excitations within the media, so that it contributes to waste heat in the process. This heat can lead to immediate distortions in the efficiency of the optical amplifier and long-term deterioration of the amplifier medium itself. Considerable engineering must take place in the optical design to handle this problem, causing the system to be bulkier and heavier than it might be otherwise.

The inherent difficulty with Raman scattering is that the material excitation itself is a high energy excitation. In order to use a Raman active medium for amplification, the optical implementation is constrained to excite the material parameter inherent to said medium. These excitations are associated with vibrational resonances in the infrared segment of the electromagnetic spectrum. The associated wavelengths of these excitations will be in the 3 to 10 micron regime. A typical amplifier beam will be in the mid-visible, at a wavelength of approximately 0.5 micron. Consequently, 10% of the pump beam will be lost to the material excitation, even if the optical system is lossless otherwise. For high power long term operation, this is a considerable loss.

SUMMARY

In a broad aspect, the stimulated Brillouin scattering optical amplifier of the present invention includes a first control optics assembly, a driver element, a second control optics assembly, a Brillouin active medium, and egressing optics. The first control optics assembly receives an incoming laser beam and adjusts that incoming laser beam in accordance with first desired wavelength, polarization and beam propagation parameters. A driver element produces a driver laser beam. A second control optics assembly receives the driver laser beam and adjusts that driver laser beam in accordance with second desired wavelength, polarization and beam propagation parameters. A Brillouin active medium receives an output from the first control optics assembly and an output from the second control optics assembly. The Brillouin active medium provides a non-linear optical interaction between the outputs such that the incoming laser beam is amplified producing an amplified Brillouin active medium output laser beam and a depleted driver laser beam. Egressing optics receives the amplified Brillouin active medium output laser beam and the depleted driver laser beam. The egressing optics controllably transmits the amplified Brillouin active medium output laser beam in accordance with third desired wavelength, polarization, and beam propagation parameters and prevents transmission of the depleted driver laser beam. The output of the egressing optics includes an amplified egressing optics output laser beam.

The use of Brillouin scattering allows parametric amplification of a weak signal with considerably less energy loss to the excitation-coupling medium than Raman scattering. This makes the overall system operation more energy efficient. It reduces the amount of engineering and design necessary to remove the large amount of waste heat associated with the Raman process. As a result, the hardware associated with the use of this amplifier in an optical system, such as an optical communication system, minimizes volume and weight. Furthermore, it provides enhanced energy efficiency.

DETAILED DESCRIPTION OF THE INVENTION

Figure 1:
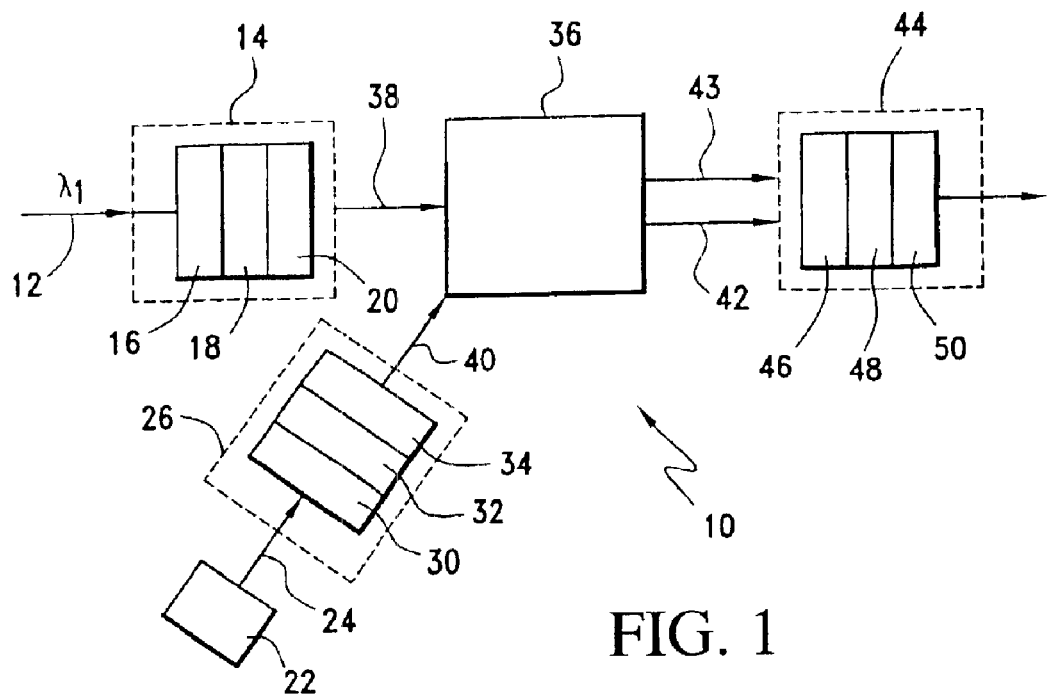
FIG. 1 is a schematic view of a preferred embodiment of the stimulated Brillouin scattering optical amplifier of the present invention.

Referring to the drawings and the characters of reference marked thereon, FIG. 1 illustrates a preferred embodiment of the present invention, designated generally as 10. An incoming laser beam 12 is received by a first control optics assembly, designated generally as 14. The laser beam, $\lambda_1$, may be generally described as an electromagnetic or light beam with a single narrow wavelength in the optical regime (0.1–10 microns), which is propagating in a uniform well-defined direction, made possible by its coherence properties. The laser beam could represent an image or could be a digitally encoded optical beam for data transmission.

The first control optics assembly 14 adjusts the incoming laser beam in accordance with first desired wavelength, polarization and beam propagation parameters. These parameters can include, for example, precise wavelength filtering to the expected signal wavelength, the optical bandwidth of the incoming signal, or the polarization of the light. The wavelength may be controlled to fit within the transparency range of the ensuing steerer. It may be more precisely filtered to fit a known input signal, either from an image or from a digitally encoded communication beam.

The assembly 14 preferably includes a wavelength control element 16 such as a color filter, an etalon, a Fabry-Perot interferometer, a Fizeau interferometer, a diffraction grating, or a notch filter, etc. A polarization control element 18 polarizes the wavefront. This may comprise, for example, a polarization plate, a Brewster's angle polarizer, or a thin film polarizer. The precise polarizer to be selected depends on the particular application's engineering requirements such as polarization rejection ratio, size and weight of the polarizer, and the wavelength range over which the steerer must operate, etc. The wavefront is then received by a propagation control element 20 such as a single lens, double lens, refractive elements or other system up to a fully engineered telescope.

A driver element 22 for encoding produces a driver laser beam 24. The driver element 22 may comprise, for example, a single frequency laser, with sufficiently high intensity to affect a nonlinear optical interaction with the incoming beam described previously. This could be a solid state laser, a high power diode laser or any number of high intensity lasers.

A second control optics assembly 26 adjusts the driver laser beam 24 in accordance with desired wavelength, polarization and beam propagation parameters. The assembly 26 preferably includes wavelength control element 30 such as a color filter, an etalon, a Fabry-Perot interferometer, a Fizeau interferometer, a diffraction grating or a notch filter. A polarization control element 32 and a propagation control element 34 are utilized, as described above.

A Brillouin active medium 36 receives an output 38 from the first control optics assembly 14 and an output 40 from the second control optics assembly 26. The Brillouin active medium 36 provides a non-linear optical interaction between the outputs 38, 40 such that an amplified Brillouin active medium output laser beam 42 and a depleted driver laser beam 43 are provided. Using stimulated Brillouin scattering as a means of amplification could provide a lower cost solution than other stimulated optical scattering techniques which do not have so much energy coupled into the material excitation. In this process, as in all stimulated processes, there is a material excitation present as the physical entity that couples the pump and signal waves. However, in this case, the excitation is an acoustic wave. A typical frequency shift associated with a Brillouin event is on the order of a few GHz, $10^6$ times smaller than that associated with a Raman excitation. Consequently, the energy loss to the material excitation and subsequently to the medium, are negligible as compared to the Raman case.

The gain coefficient for the stimulated Brillouin process is given in Chapter 11 of Principles of Nonlinear Optics by Y. R. Shen. Quoted here, the gain coefficient, $G_B$, is given by $$G_B = \frac{4\pi\omega_2^2}{|k_2|c^2} \mathrm{Im}\chi_B^{(3)}|E_1|^2,$$

where $\omega_2$ is the pump laser frequency, $k_2$ is the pump wave vector, c is the speed of light, $\chi^8_{(3)}$ is the third order Brillouin susceptibility, and $|E_1|$ is the absolute magnitude of the pump laser.

The driver output 40 enters the Brillouin active medium 36 along with the weak beam 38 whose intensity is to be amplified. Via a coupled wave $\chi^{(3)}$ process, energy is transferred from the pump or driver beam 43 to the weak beam 38. The material excitation present as the physical entity that couples the pump and signal waves is an acoustic wave. A typical frequency shift associated with a Brillouin event is on the order of a few GHz. The physical process that leads to the growth of the acoustic wave also leads to the growth of the weak beam 38, as the wave processes are coupled.

Examples of Brillouin active media include carbon disulphide (CS2), toluene, doped optical fiber, acetone, n-hexane, toluene, $CCl_4$, methanol, benzene, $H_2O$, and cyclohexane. Such materials allow good efficiency in the nonlinear optical interaction.

The Brillouin active medium may be a stimulated thermal Brillouin material comprising a multi-component material. An acoustic wave, which can be described as a time dependent density variation in the material in question, is more general than that described in the above paragraphs. In the previous case, the light scattering is assumed to contain low-frequency thermodynamic fluctuations in a single-component medium. The density fluctuation is actually a function of pressure, p, and entropy, S. Then, the material excitation will include pressure, wave and entropy wave components. Rather than using the thermodynamic variables p and S, one can use the independent quantities, $\rho$ and T. Including absorption of the light energy (which is neglected in normal stimulated Brillouin scattering), heating of the sample can occur. Light scattering under a condition of heating caused by material absorption is called thermal Brillouin scattering. The gain coefficient for thermal Brillouin scattering is given by $$G_{TB} = \frac{\omega_2 \gamma \alpha \beta_T}{8\pi C_P \rho_0 \Gamma_B},$$

where $\omega_2$ is the frequency of the amplified signal, $\gamma$ is the electrostrictive coefficient for the thermal Brillouin case, $\alpha$ is the linear absorption coefficient of the Brillouin medium, $\beta_T$ is the isothermal compressibility, $C_p$ is the heat capacity at constant volume, $\rho_0$ is the medium density, and $\Gamma_B$ is the Brillouin damping coefficient. Materials which exhibit thermal Brillouin scattering are typically multi component systems, composed primarily of a Brillouin active medium, combined with a small amount of material which is absorptive at the material excitation resonance. For example, $CS_2$ or $CCl_4$ doped with $I_2$ will produce a medium which exhibits thermal Brillouin scattering. This multi-component material includes a Brillouin active material that exhibits thermal Brillouin scattering, combined with a small amount of material that is absorptive at the material excitation resonance. Such a material may be, for example, $CS_2$ or $CCl_4$ doped with $I_2$.

Egressing optics 44 receives the output 42 of the Brillouin active medium 36 and adjusts that laser beam in accordance with desired wavelength, polarization, and beam propagation parameters. The output of the egressing optics has the laser beam propagation direction shifted relative to the incoming laser beam direction. Egressing optics 44 includes an egressing wavelength control element 46, an egressing propagation control element 48 and an egressing polarization control element 50. These components may be discussed above with respect to assemblies 14 and 26.

Figure 2:
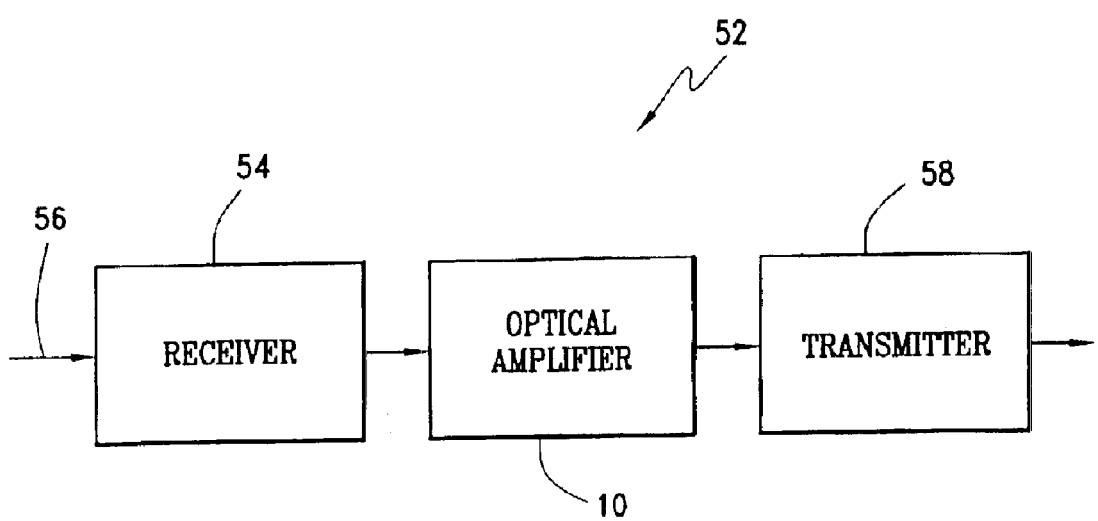
FIG. 2 is a schematic view of a communication system implementing a stimulated Brillouin scattering optical amplifier in accordance with the principles of the present invention.

Referring now to FIG. 2, integration of the stimulated Brillouin scattering optical amplifier of the present invention is illustrated into an optical communication system, designated generally as 52. The communication system 52 includes an optical receiver 54 that receives a relatively weak signal 56 entering via, for example, a fiber or free space. The receiver 54 may be, for example, a telescope or commercially available fiber terminator for collecting a free space propagated signal or fiber optically propagated signal, respectively. The optics associated with the receiver will be a combination of refractive or reflective elements which couple the weak input into the amplifier stage. The optical amplifier 10 receives the output from the receiver 54 and provides an output to an optical transmitter 58. The optical transmitter 58 may typically be a telescope, if free space, or fiber launcher for fiber optic based propagation. The optics associated with the transmitter is a suitable a combination of refractive or reflective elements which couple the amplified signal from the amplifier stage.

The optical communication system may be used for a number of applications. For example, it may be an optical repeater for a telecommunication system, a long distance internet communication system or short haul distribution system for connecting to individual users.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

What is claimed is:

1. A stimulated Brillouin scattering optical amplifier, comprising:
    a) a first control optics assembly for receiving an incoming laser beam and adjusting that incoming laser beam in accordance with first desired wavelength, polarization and beam propagation parameters;
    b) a driver element for producing a driver laser beam;
    c) a second control optics assembly for receiving said driver laser beam and adjusting that driver laser beam in accordance with second desired wavelength, polarization and beam propagation parameters;
    d) a Brillouin active medium for receiving an output from the first control optics assembly and an output from the second control optics assembly, said Brillouin active medium providing a non-linear optical interaction between said outputs such that the incoming laser beam is amplified producing an amplified Brillouin active medium output laser beam and a depleted driver laser beam; and,
    e) egressing optics for receiving said amplified Brillouin active medium output laser beam and said depleted driver laser beam, said egressing optics for controllably transmitting said amplified Brillouin active medium output laser beam in accordance with third desired wavelength, polarization, and beam propagation parameters and preventing transmission of said depleted driver laser beam, the output of said egressing optics comprising an amplified egressing optics output laser beam.

2. The optical amplifier of claim 1, wherein said first control optics assembly, comprises:
    a first set of serially positioned control elements for receiving the incoming laser beam, said first set of control elements comprising a first wavelength control element, a first propagation control element and a first polarization control element, said first set of control elements providing an first control optics assembly output to said Brillouin active medium.

3. The optical amplifier of claim 1, wherein said first control optics assembly, comprises:
    a first set of serially positioned control elements for receiving the incoming laser beam, said first set of control elements comprising a first wavelength control element, a first propagation control element and a first polarization control element, said first set of control elements providing an first control optics assembly output to said Brillouin active medium.

4. The optical amplifier of claim 1, wherein said Brillouin active medium comprises carbon disulphide (CS2).

5. The optical amplifier of claim 1, wherein said Brillouin active medium comprises toluene.

6. The optical amplifier of claim 1, wherein said Brillouin active medium comprises acetone.

7. The optical amplifier of claim 1, wherein said Brillouin active medium comprises n-hexane.

8. The optical amplifier of claim 1, wherein said Brillouin active medium comprises CCI.

9. The optical amplifier of claim 1, wherein said Brillouin active medium comprises methanol.

10. The optical amplifier of claim 1, wherein said Brillouin active medium comprises cyclohexane.

11. The optical amplifier of claim 1, wherein said Brillouin active medium comprises a stimulated thermal Brillouin material.

12. The optical amplifier of claim 1, wherein said Brillouin active medium comprises a stimulated thermal Brillouin material comprising Brillouin active material combined with material that is absorptive at the material excitation resonance.

13. The optical amplifier of claim 1, wherein said Brillouin active medium comprises a stimulated thermal Brillouin material comprising Brillouin active material combined with material that is absorptive at the material excitation resonance, said Brillouin active material comprising CS2 and said absorptive material comprising $I_2$.

14. The optical amplifier of claim 1, wherein said Brillouin active medium comprises a stimulated thermal Brillouin material comprising Brillouin active material combined with material that is absorptive at the material excitation resonance, said Brillouin active material comprising CCI and said absorptive material comprising $I_2$.

15. An optical communication system, comprising:
    a) an optical receiver for receiving an incoming laser beam and providing a receiver output;
    b) a stimulated scattering optical amplifier, comprising:
        i) a first control optics assembly for receiving said receiver output and adjusting that receiver output in accordance with first desired wavelength, polarization and beam propagation parameters;
        ii) a driver element for producing a driver laser beam;
        iii) a second control optics assembly for receiving said driver laser beam and adjusting that driver laser beam in accordance with second desired wavelength, polarization and beam propagation parameters;
        iv) a Brillouin active medium for receiving an output from the first control optics assembly and an output from the second control optics assembly, said Brillouin active medium providing a non-linear optical interaction between said outputs such that the incoming laser beam is amplified producing an amplified Brillouin active medium output laser beam and a depleted driver laser beam; and
        v) egressing optics for receiving said amplified Brillouin active medium output laser beam and said depleted driver laser beam, said egressing optics for controllably transmitting said amplified Brillouin active medium output laser beam in accordance with third desired wavelength, polarization, and beam propagation parameters and preventing transmission of said depleted driver laser beam, the output of said egressing optics comprising an amplified egressing optics output laser beam; and,
    c) a transmitter for receiving said egressing optics output laser beam and providing a transmitter output.

16. The optical communication system of claim 15, wherein said Brillouin active medium comprises carbon disulphide (CS2).

17. The optical communication system of claim 15, wherein said Brillouin active medium comprises toluene.

18. The optical communication system of claim 15, wherein said Brillouin active medium comprises acetone.

19. The optical communication system of claim 15, wherein said Brillouin active medium comprises n-hexane.

20. A method for amplifying a laser beam comprising the steps of:
  a) adjusting an incoming laser beam in accordance with first desired wavelength, polarization and beam propagation parameters;
  b) producing a driver laser beam;
  c) adjusting said driver laser beam in accordance with second desired wavelength, polarization and beam propagation parameters;
  d) utilizing a Brillouin active medium for receiving the adjusted incoming laser beam and said adjusted driver laser beam, said Brillouin active medium providing a non-linear optical interaction between said adjusted incoming laser beams such that the incoming laser beam is amplified producing an amplified Brillouin active medium output laser beam and a depleted driver laser beam; and,
  f) receiving said amplified Brillouin active medium output laser beam and said depleted driver laser beam, utilizing egressing optics, said egressing optics for controllably transmitting said amplified Brillouin active medium output laser beam in accordance with third desired wavelength, polarization, and beam propagation parameters and preventing transmission of said depleted driver laser beam, the output of said egressing optics comprising an amplified egressing optics output laser beam.

21. The method of claim 20, wherein said step of adjusting said incoming optical laser beam comprises:
  utilizing a first set of serially positioned control elements for receiving the incoming laser beam, said first set of control elements comprising a first wavelength control element, a first propagation control element and a first polarization control element, said first set of control elements providing an output to said driver element.

22. The method of claim 20, wherein said step of adjusting said incoming optical laser beam, comprises:
  utilizing a second wavelength control element for receiving the driver optical wavefront; and,
  utilizing a second propagation control element for receiving the output of the second wavelength control element.

23. The method of claim 20, wherein said step of utilizing a Brillouin active medium comprises utilizing carbon disulphide (CS2).

24. The method of claim 20, wherein said step of utilizing a Brillouin active medium comprises utilizing toluene.

25. The method of claim 20, wherein said step of utilizing a Brillouin active medium comprises utilizing acetone.

26. The method of claim 20, wherein said step of utilizing a Brillouin active medium comprises utilizing n-hexane.

27. The method of claim 20, wherein said step of utilizing a Brillouin active medium comprises utilizing a stimulated thermal Brillouin material comprising Brillouin active material combined with material that is absorptive at the material excitation resonance.

* * * * *